US012811211B2

(12) United States Patent
Totman et al.

(10) Patent No.: US 12,811,211 B2
(45) Date of Patent: Nov. 24, 2026

(54) BATTERY MODULE AND METHOD FOR COOLING THE BATTERY MODULE

(71) Applicant: RIMAC AUTOMOBILI D.O.O., Sveta Nedelja (HR)

(72) Inventors: Mel Totman, Buzet (HR); Nikola Bričić, Zagreb (HR); Filip Cesar, Marija Bistrica (HR); Mate Rimac, Konscica (HR); Ante Šarić, Zagreb (HR)

(73) Assignee: RIMAC AUTOMOBILI D.O.O., Sveta Nedelja (HR)

( * ) Notice: Subject to any disclaimer, the term of this patent is extended or adjusted under 35 U.S.C. 154(b) by 801 days.

(21) Appl. No.: 18/246,952

(22) PCT Filed: Sep. 27, 2021

(86) PCT No.: PCT/HR2021/000008

§ 371 (c)(1),
(2) Date: Mar. 28, 2023

(87) PCT Pub. No.: WO2022/069910

PCT Pub. Date: Apr. 7, 2022

(65) Prior Publication Data

US 2023/0378561 A1 Nov. 23, 2023

(30) Foreign Application Priority Data

Oct. 2, 2020 (HR) ............................... P20201569A

(51) Int. Cl.
*H01M 10/613* (2014.01)
*H01M 10/625* (2014.01)
(Continued)

(52) U.S. Cl.
CPC ....... *H01M 10/613* (2015.04); *H01M 10/625* (2015.04); *H01M 10/643* (2015.04);
(Continued)

(58) Field of Classification Search
CPC ............. H01M 10/613; H01M 10/643; H01M 10/6568; H01M 50/291; H01M 50/213
See application file for complete search history.

(56) References Cited

U.S. PATENT DOCUMENTS 6,448,741 B1 * 9/2002 Inui ..................... H01M 10/658 320/107
2015/0200429 A1 7/2015 Lee et al.
(Continued)

FOREIGN PATENT DOCUMENTS

WO 2016117684 A1 7/2016

OTHER PUBLICATIONS

Machine Translation of Kugino (WO 2016/117684 A1). (Year: 2016).*
International search report for PCT/HR2021/000008 mailed on Jan. 19, 2022.

*Primary Examiner* — Jonathan G Jelsma
(74) *Attorney, Agent, or Firm* — Dennemeyer & Associates LLC

(57) ABSTRACT

Battery module and method for cooling the battery module are provided. The battery module comprises a housing and a plurality of battery cells positioned inside the housing, an inlet for feeding the cooling fluid into the housing and an outlet for feeding the cooling fluid away from the housing, a first cell holder and a second cell holder for holding battery cells, each cell holder positioned inside the housing, the first cell holder and the second cell holder spaced apart and each cell holder connected to the housing. The module further comprises a first cooling channel partially bounded by a housing cover and the first cell holder, a second cooling channel partially bounded by a housing base and the second cell holder, a middle cooling channel partially bounded by the first cell holder and the second cell holder. The first cooling channel and the second cooling channel are fluidly
(Continued)

connected both to the inlet and the middle cooling channel, and the middle cooling channel is fluidly connected with the outlet. The battery cells are projecting inside the first cooling channel and/or the second cooling channel.

29 Claims, 13 Drawing Sheets

(51) Int. Cl.

| | |
|---|---|
| ***H01M 10/643*** | (2014.01) |
| ***H01M 10/6568*** | (2014.01) |
| ***H01M 50/213*** | (2021.01) |
| ***H01M 50/271*** | (2021.01) |
| ***H01M 50/291*** | (2021.01) |
| ***H01M 50/505*** | (2021.01) |

(52) U.S. Cl.
CPC ..... *H01M 10/6568* (2015.04); *H01M 50/213* (2021.01); *H01M 50/271* (2021.01); *H01M 50/291* (2021.01); *H01M 50/505* (2021.01); *H01M 2220/20* (2013.01)

(56) References Cited

U.S. PATENT DOCUMENTS

| | | | | |
|---|---|---|---|---|
| 2018/0040862 | A1* | 2/2018 | Yi | H01M 50/213 |
| 2018/0254536 | A1 | 9/2018 | Chidester et al. | |
| 2019/0252744 | A1 | 8/2019 | Zimmermann et al. | |
| 2020/0006827 | A1 | 1/2020 | Filter et al. | |
| 2020/0076022 | A1* | 3/2020 | Kawakami | H01M 50/581 |

* cited by examiner

BATTERY MODULE AND METHOD FOR COOLING THE BATTERY MODULE

CROSS-REFERENCE TO RELATED APPLICATIONS

This is a 35 U.S.C. 371 National Stage Patent Application of International Application No. PCT/HR2021/000008, filed Sep. 27, 2021, which claims priority to HR application P20201569A, filed Oct. 2, 2020, each of which is hereby incorporated by reference in its entirety.

FIELD OF THE INVENTION

The present invention concerns a battery module and a method for cooling battery cells of the battery module.

BACKGROUND

The use of electric-drive vehicles may result in a decrease in a number of fossil-fuel powered vehicles, reducing the negative impact on the environment making automotive transportation ecologically acceptable. An energy-storage system such as a battery pack is an essential part of electric-drive vehicles. Electric-drive vehicles include hybrid electric vehicles, plug-in hybrid electric vehicles and all-electric vehicles.

However, present energy-storage systems have deficiencies, among a few are large size and weight resulting in inefficiency and poor safety. For example, in electric-drive vehicles, the size and weight of the batteries are a significant factor, affecting vehicle dynamics and overall performance.

Electric-drive vehicles call for a critical requirement for thermal management, while individual battery cells are placed in close proximity, and many cells are electrically coupled together resulting in significant heat generation during charge and discharge. Heat present in automotive energy-storage systems should be carefully managed. Present thermal management solutions not only occupy a superfluous amount of space but also endure inefficiencies originating from temperature imbalance among battery cells and redundant resistance in various electrical connections.

Therefore, there is a need for a battery design that incorporates the thermal management needed for successful operation in electric vehicles without drawbacks such as reduction of energy-storage capacity or power output while reduction of the overall weight is required.

It is an aim of the present invention to mitigate or obviate at least some of the above-mentioned disadvantages.

BRIEF SUMMARY OF THE INVENTION

According to the first aspect of the present invention, there is provided a battery module adapted for use with a cooling fluid. The battery module is comprising: a housing having a cover, a base, and a housing wall that runs around circumferential direction; a plurality of battery cells positioned inside the housing, the battery cells having a first end and a second end and each battery cell has a positive terminal and a negative terminal; an interconnection for electrically connecting at least one terminal of the battery cells; an inlet fluidly connected with the housing for feeding the cooling fluid into the housing; an outlet fluidly connected with the housing for feeding the cooling fluid away from the housing; a first cell holder and a second cell holder for holding battery cells, each cell holder positioned inside the housing, the first cell holder and the second cell holder spaced apart and each cell holder connected to the housing. The battery module further comprises a first cooling channel at least partially bounded by the cover and the first cell holder, a second cooling channel at least partially bounded by the base and the second cell holder; a middle cooling channel at least partially bounded by the first cell holder and the second cell holder; wherein the first cooling channel and the second cooling channel are fluidly connected both to the inlet and the middle cooling channel, and wherein the middle cooling channel is fluidly connected with the outlet, and wherein the battery cells are projecting inside the first cooling channel and/or the second cooling channel.

In an embodiment, the cell holders are solid plates of substantionaly constant thickness.

In an embodiment, the cell holders comprise a plurality of through holes adapted for accepting the battery cells.

In an embodiment, the inlet and the outlet are positioned at a proximal side of the battery module, and means for fluidly connecting the first cooling channel and the middle cooling channel and the second fluid channel and the middle cooling channel are positioned at a distal side of the battery module. Preferably, the channels are fluidly connected through at least one through hole in the first cell holder and in the second cell holder.

In an embodiment, at least one of the cell holders comprises guiding protrusions for facilitating positioning of the battery cells into the holders.

In an embodiment, the first cell holder and the second cell holder are positioned substantially parallel to each other.

In an embodiment, a distance between the first cell holder and the second cell holder is varying in a longitudinal direction. In another embodiment, the distance between the first cell holder and the second cell holder is decreasing in the longitudinal direction.

In an embodiment, the cover and/or the base has a convex shape.

In an embodiment, the battery module is further comprising a battery box for holding the battery cells, wherein the battery box comprises two opposite battery box walls connected to each other through the first cell holder and the second cell holder, and wherein the first cell holder and the second cell holder are integral part of the battery box.

In an embodiment, the housing wall comprises two side walls and two battery box walls.

In an embodiment, the battery module comprises a plurality of structural beams. In the preferred embodiment, the structural beams are extending from the first cell holder to the second cell holder and/or from the first cell holder to the cover and/or from the second cell holder to the base.

In an embodiment, the battery box is integrally made in one piece of material, and/or the battery box is fabricated using injection molding or 3D printing.

In an embodiment, the interconnection is positioned between the second cell holder and the base and/or between the first cell holder and the cover.

In an embodiment, the size of the projection of the battery cells inside the first cooling channel and/or to the second cooling channel is at least 0.5% of the total size of the battery cells.

In an embodiment, the battery module comprises a third cell holder positioned between the first cell holder and the second cell holder.

In an embodiment, the battery cells are oriented in a plurality of rows and columns. In one preferred embodiment a distance between the battery cells in one row and/or a distance between rows is substantially constant, while in another embodiment, a distance between the battery cells in one row and/or a distance between rows is variable. In one embodiment a distance between the battery cells in at least one row is increasing or decreasing in the longitudinal direction.

In an embodiment, at least one of the cell holders comprises a layer deposited on top or bottom of the at least one of cell holders. Preferably, the additional layer is solified potting liquid.

In embodiment, the battery module comprises a stabilizing member positioned inside at least one of the through holes. Preferably, a thickness of the stabilizing member is smaller than thickness of the cell holders, and the stabilizing member is an integral part of the cell holder According to a further aspect of the present invention, there is provided a method for cooling a battery module using a cooling fluid, the battery module comprising a plurality of battery cells positioned inside the housing, the battery cells having a first end and a second end, the method comprising the steps performed in the following order: guiding the cooling fluid over the first end and/or the second end of the battery cells, and guiding the cooling fluid over the middle part of the battery cells.

In an embodiment, the method is performed using the battery module described in any one of the embodiments described above.

In an embodiment, the method uses a dielectric cooling fluid.

BRIEF DESCRIPTION OF THE DRAWINGS

The invention will be better understood with the aid of the description of embodiments given by way of example only and illustrated by the figures, in which.

DETAILED DESCRIPTION OF POSSIBLE EMBODIMENTS OF THE INVENTION

Figure 1:
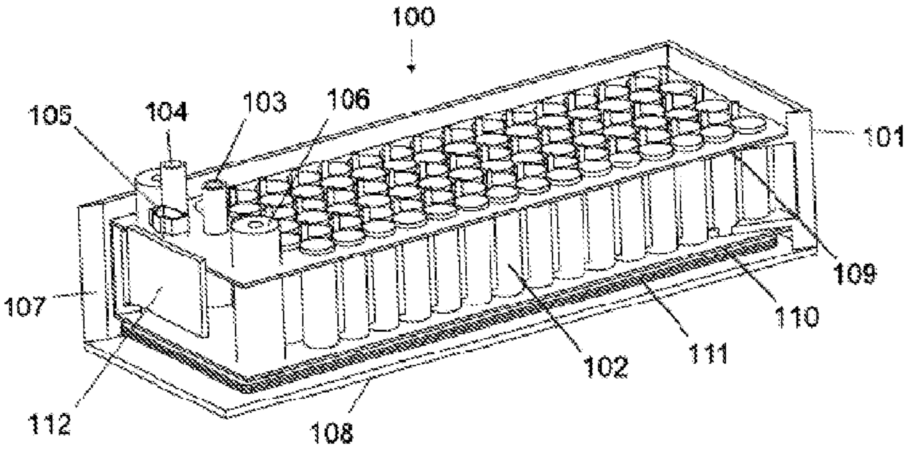
FIG. 1 illustrates a perspective partial view of the battery module according to the certain embodiments of the present invention.

FIG. 1 illustrates a battery module 100 according to one embodiment of the present invention. A plurality of battery cells 102 is positioned inside a module housing 101. In one embodiment the housing 101 has a rectangular box-like shape having a means to accommodate the battery cells 102 in the upright position as shown in FIG. 1. FIG. 1 shows partial perspective view of the module 100 without cover and without two side walls. The housing 101 comprises a cover (not shown), a base 108, and a housing wall 107 that runs around a circumferential direction. The wall 107 is supported on the base 18, and it is closed from the upper side with the cover. The wall 107 may be attached to the base 108 and the cover through any suitable connecting or fastening means. For example, the connection may be done by laser or ultrasonic welding, or by bonding. Any suitable connecting means may be used, since this is not an essential feature of the invention. In some embodiments, the wall 107 and the base 108 and/or cover may be made as an integral structure.

Figure 8A:
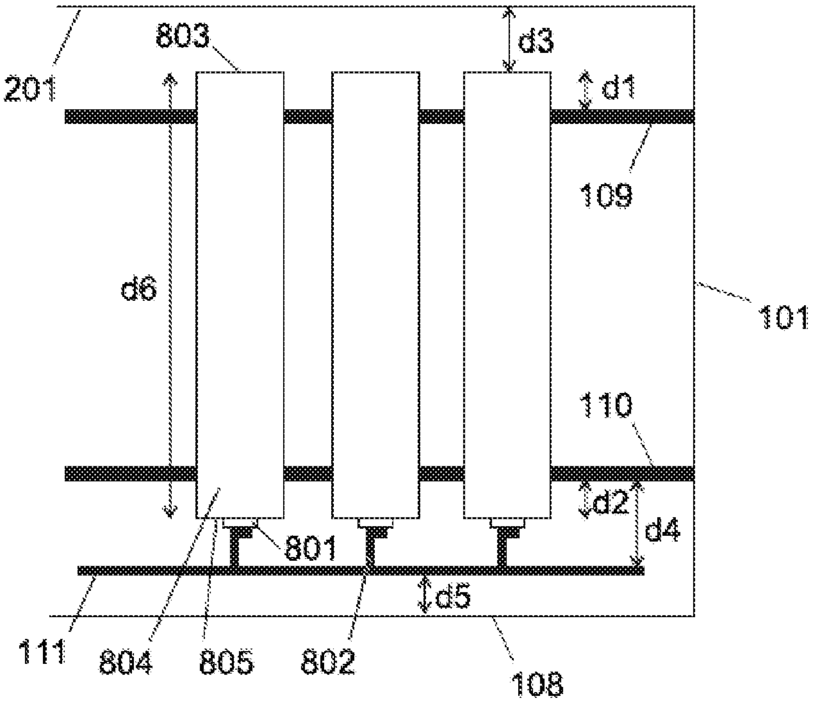
FIGS. 8*a* and 8*b* illustrate cross-sectional partial view of of the battery module, according to certain embodiments of the invention.

Preferably, the battery cells 102 are positioned in the uniform direction inside the module housing 101. The battery cells may be preferably oriented in rows and columns as shown in FIG. 1, but they might have other positioning configurations as well. The battery cells 102 have a first end 803 and a second end 804, and each battery cell 102 has a positive terminal 801 and a negative terminal 805 as shown in FIG. 8*a*.

FIG. 1 shows a first cell holder 109 and a second holder 110. The cell holders hold the battery cells 102 substantially in a sealing-tight fashion. In one preferred embodiment, the cell holders 109,110 are solid plates of substantially constant thickness. In one embodiment the cell holders 109,110 are flat, while in another embodiment they may have convex shape looking from the inside of the module. The convex shape may be advantageous during the cooling process.

During the operation of the battery module 100, the battery cells 102 generate heat. The battery module 100 is adapted to be used with a cooling liquid. As shown in FIG. 1, the battery module 100 comprises an inlet 103 fluidly connected with the housing 101 for feeding the cooling fluid into the housing, and it comprises an outlet 104 fluidly connected with the housing 101 for feeding the cooling fluid away from the housing. As shown in FIG. 1, the inlet 103 and the outlet 104 may have a cylindrical cross-section, but other shapes are possible since this shape is not an essential feature of the invention. In addition, the inlet 103 and/or the outlet 104 may be sticking out of the housing (male connectors) or they may be inside the housing (female connectors). Also, the positions of the inlet 103 and the outlet 104 are not fixed on the specific position on the housing 101. For example, they may be on the top, on the bottom, or on the side wall of the housing 101. In one embodiment, the battery module 100 may have multiple inlets 103 and/or outlets 104.

The battery module 100 may comprise a high-voltage (HV) connector 106 and a low-voltage (LV) connector 105 for connecting the battery module 100 to the external electrical connections. In the preferred embodiment, there are two HV connectors 106 and one LV connector 105. In addition, the position of HV and LV connectors are not fixed on the housing 101, and they may be, for example, on the top, bottom, or on the side wall of the housing 101. LV connector 105 is optional part of the battery module 100 and it is not an essential for the invention.

Figure 2:
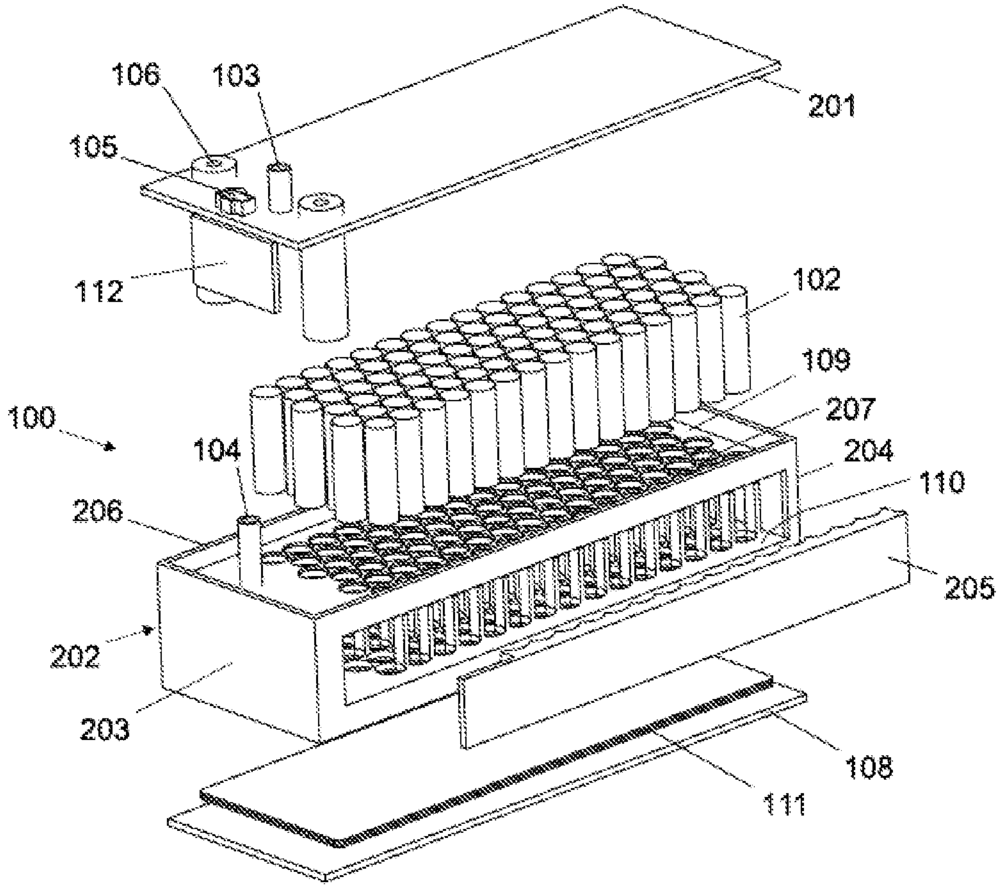
FIG. 2 illustrates an exploded view of the battery module, according to certain embodiments of the invention.

FIG. 2 illustrates an exploded view of the embodiment of the battery module 100. The battery module 100 comprises the first cell holder 109 and a second cell holder 110 for holding battery cells 102. Each cell holder is positioned inside the housing 101. The first cell holder 109 and the second cell holder 110 are spaced apart. In one preferred embodiment, the cell holders 109,110 are spaced in the direction of the gravity as shown in FIG. 2. Each cell holder 109,110 is connected to the housing 101. The plurality of the battery cells 102 is positioned to be held by both the cell holder 109 and the cell holder 110. In another preferred embodiment the cell holders 109,110 are substantially parallel. The cell holders may comprise a plurality of through holes 207 adapted for accepting the battery cells 102. The through holes 207 may have different shapes in order to fit the shape of the batteries 102.

Figure 3:
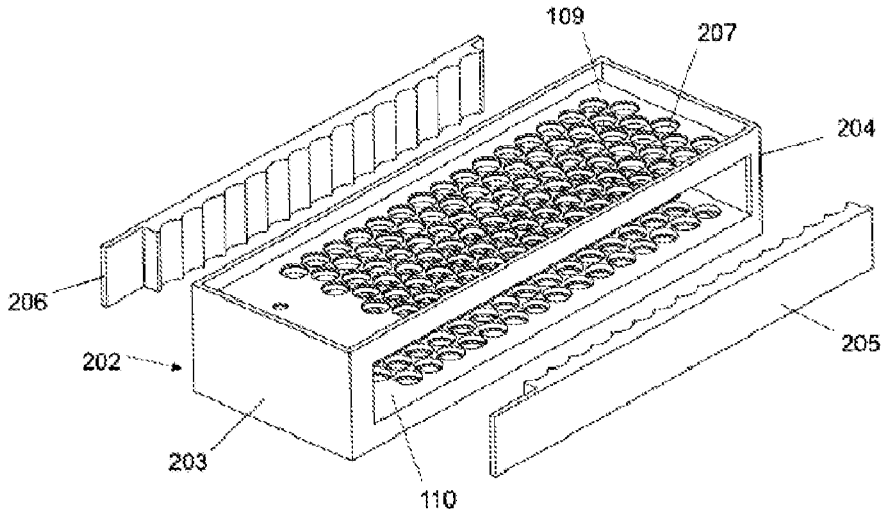
FIG. 3 illustrates a perspective view of the battery box, according to certain embodiments of the invention.

In one preferred embodiment shown in FIG. 2, the battery module 100 comprises a battery box 202 for holding the battery cells 102. The battery box 202 comprises two opposite battery box walls 203,204 connected to each other through the first cell holder 109 and the second cell holder 110. In this preferred embodiment, the first cell holder 109 and the second cell holder 110 are an integral part of the battery box 202. While the side walls of the battery box 202 are preferably closed, the opposite two sides of the battery box 202 may be preferably open. In one preferred embodiment, the housing wall 107 comprises two side walls 205, 206 and two battery box walls 203,204. In one preferred embodiment, the battery box 202 is cellularly structured. FIG. 3 shows the battery box 202 and side walls 205,206 in more detail. In one preferred embodiment, the shape of the side walls 205,206 substantially follows the shape of the batteries 102. In one embodiment, the shape of the side walls may follow the shape of the batteries along the whole length from the base 108 to the cover 201.

In one preferred embodiment shown in FIG. 2, the electrical HV connection 106 and LV connection 105 are positioned on the cover 201 of the battery module 100. In another preferred embodiment, the inlet 103 and the outlet 104 are also positioned on the cover 201 of the battery module 100, and they are in fluid communication with a cooling space inside the battery module 100. The cooling space may be defined as a space limited by the interior of the module housing 101 bounded by the housing wall 107, the base 108, and the cover 201. In the embodiment that comprises the battery box 202, the cooling space may be bonded by two side walls 205,206 and two battery box walls 203,204.

The battery module 100 may also comprise a battery management system (BMS) 112 which is immersed in the cooling fluid during the cooling operation. The battery module 100 comprises an interconnection 111 for electrically connecting at least one terminal of the battery cells 102. The interconnection 111 is made of several conduction layers with integrated joule fuses and sensors. Both positive and negative terminal of each battery cell 102 may be located on one end of the battery cell. In another embodiment, positive and negative terminal of each battery cell 102 may be located on the opposite ends of the battery cell. Terminals of the plurality of the battery cells may be oriented towards the base 108 or they may be oriented towards the cover 201. Battery cell terminals may be connected, for example they may be welded to the interconnection 111. In one preferred embodiment, the interconnection 111 is connected to the base 108. BMS 112 collects the data from the interconnection 111 and sends it via LV terminal 105. In one preferred embodiment, the interconnect 111 is positioned between the battery box 202 and the base 108, while in another embodiment the interconnect 111 is positioned between the battery box 202 and the cover 201, and in yet another embodiment, the battery module 100 may have a combination of two interconnects 111 as described above.

In one embodiment the surfaces of the side wall 205 and the side wall 206 follow the imaginary offset line of the nearest battery cells 102 assembled in the battery box 202. Advantageously, in this case, there are no vortexes of the coolant fluid which increase the resistance of the flow of the cooling fluid when passing through the battery module.

As shown in FIG. 2 and FIG. 3, the cell holders 109,110 have a plurality of through holes 207 to accommodate the battery cells 102. In the preferred embodiment, the through holes 207 are aligned accordingly in the vertical direction, so that the same battery cell 102 could be positioned in both cell holders. The sizes of the through holes 207 are bigger than the cross-section of the battery cells 102. Preferably, the battery cells 102 may be position in the through holes 207 in a seal-tight fashion.

Figure 4:
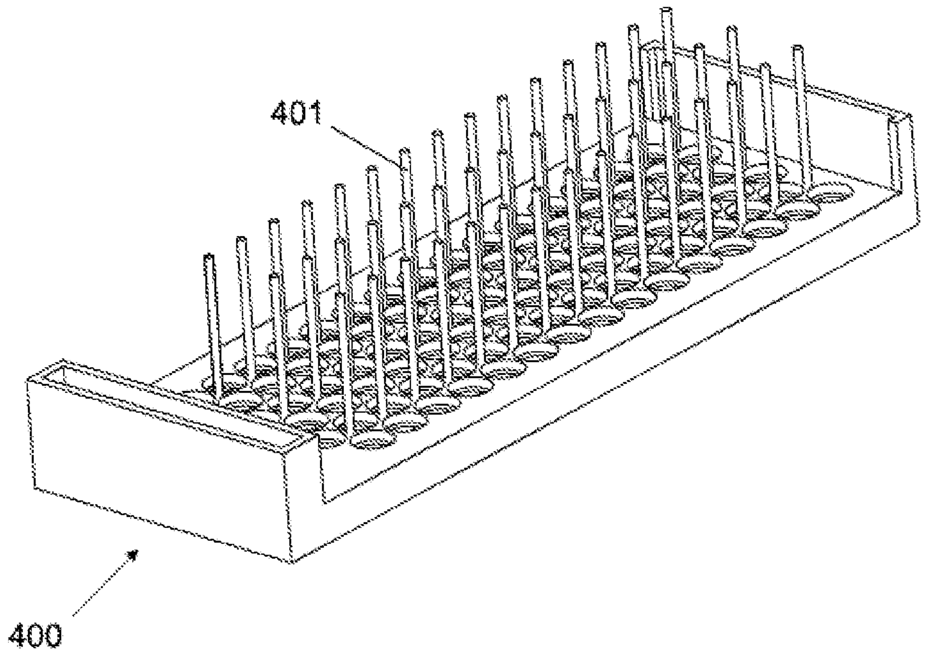
FIG. 4 illustrates a perspective sectional view of the patent box, according to certain embodiments of the invention.
Figure 5A:
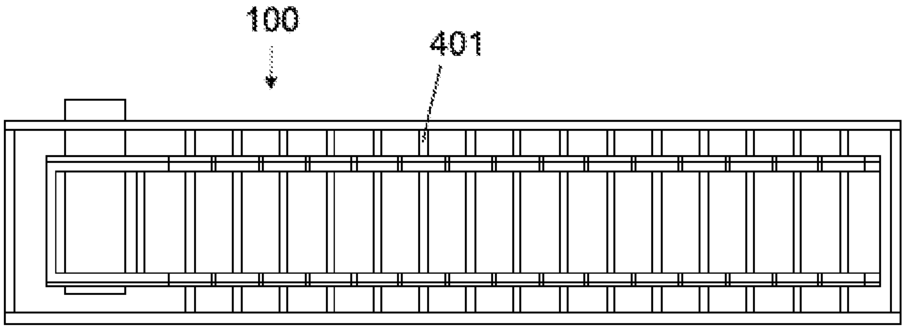
FIGS. 5*a*-5*d* illustrate a cross-section view of the battery module comprising structural beams, according to certain embodiments of the invention.
Figure 5B:
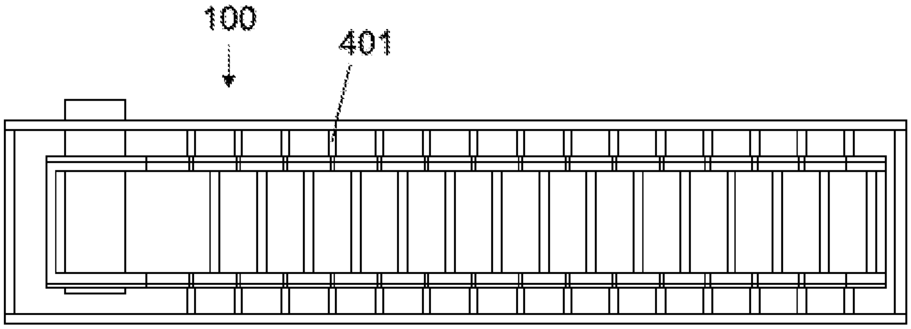
Figure 5C:
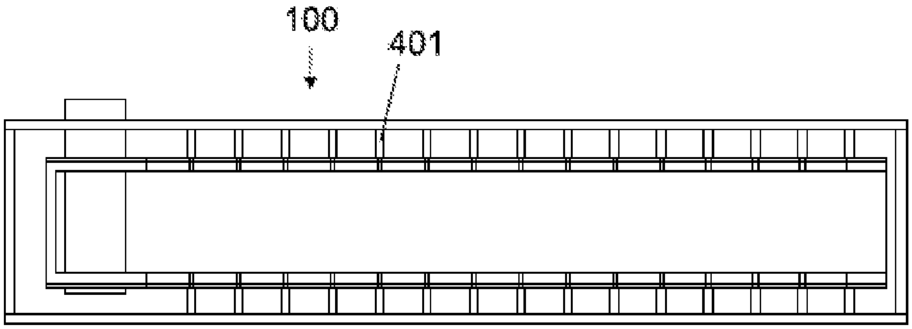
Figure 5D:
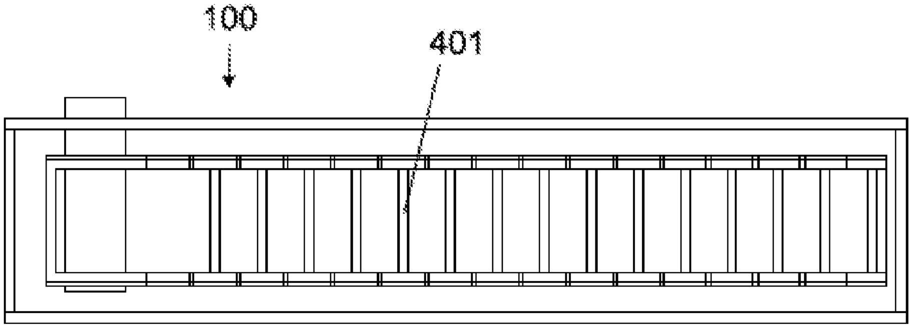

The battery module 100 may have a plurality of structural integrity beams 401. FIG. 4 shows an embodiment wherein the beams 401 are part of the battery box 400. Advantageously, the structural integrity beams 401 not only improve structural rigidity of the battery box 400 by providing force-transmitting connection between the components of the battery module 100, but also improve structural rigidity of the whole battery module 100. The structural integrity beams 401 may be distributed in different configurations inside the battery box 400. In one preferred embodiment, they are distributed in parallel rows as shown in FIG. 4, but in general, the beams 401 may be distributed in any location between the individual cells 102, and their number may vary.

FIGS. **5*a*-5*d* show cross-sections of battery module 100 comprising different embodiments which include the beams 401. The main purpose of the beams 401 is to provide structural support to the battery module 100** in several different ways:

a) connecting cell holders 109,110 with the base 108 and the cover 201 as shown in FIG. **5*c***;
b) connecting cell holders 109 and 110 together as shown in FIG. **5*d***;
c) combination of a) and b) as shown in FIGS. **5*a* (beams aligned) and 5*b*** (beams misaligned).

In one embodiment, the individual beams 401 may be constructed out of two or more individual pieces joined. In addition, the beams 401 may be the integral parts of cell holders 109,110 and/or the battery box 202.

In one embodiment, ends of the structural integrity beams 401 may protrude from the first cell holder 109 towards the cover 201 and they may be laser welded to the cover 201. In yet another embodiment, structural integrity beams 401 may protrude from the second cell holder 110 towards the base 108 and they may be laser welded to the base 108. In this way, the first cell holder 109 and the second cell holder 110 are connected in force-transmitting fashion preventing the inflammation of the battery module 100.

The through holes 207 and the battery cells 102 may be preferably arranged in rows and columns. In one embodiment, the row of through holes 207 on either the first cell holder 109 or the second cell holder 110 may be defined as a series of holes parallel with a longer side of the battery box 202 and the column of through holes 207 on either the first cell holder 109 or the second cell holder 110 as a series of holes perpendicular to longer side of the battery box 202 as shown in FIG. 3.

Figure 6:
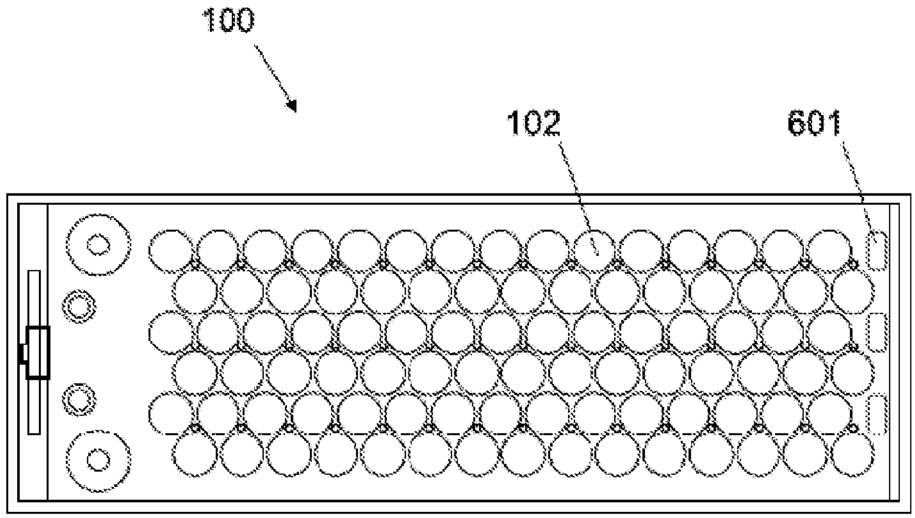
FIG. 6 illustrates a cross-sectional top view of the battery module, according to certain embodiments of the invention.
Figure 7A:
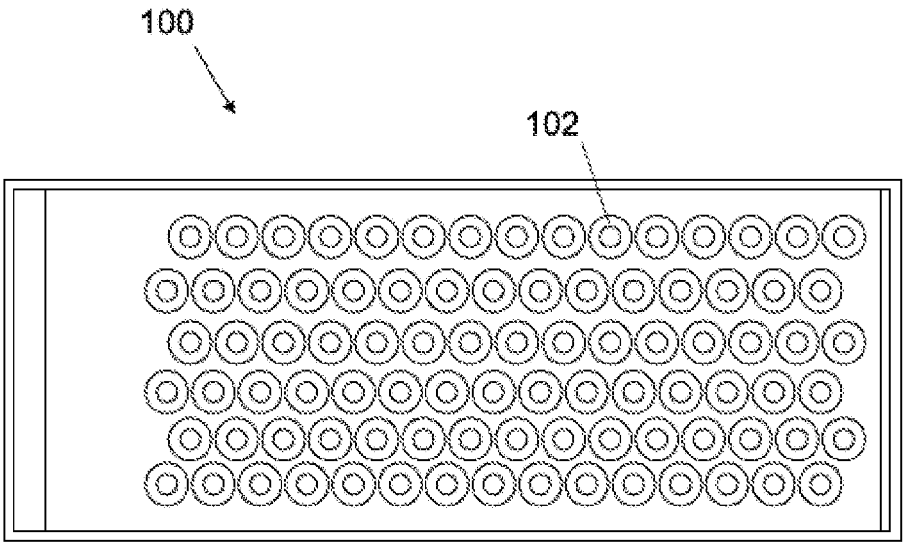
FIGS. 7*a* and 7*b* illustrate cross-sectional top view of the battery module, according to certain embodiments of the invention.
Figure 7B:
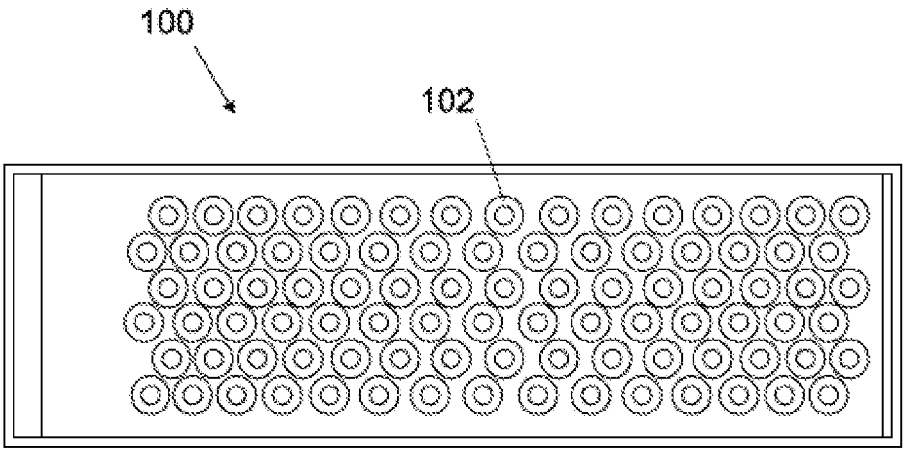

In one embodiment a distance between the battery cells 102 in one row and/or a distance between rows is substantially constant as shown in FIG. 6. In another embodiment, a distance between the battery cells 102 in one row and/or a distance between rows is variable. In one preferred embodiment, a distance between the battery cells in at least one row is increasing or decreasing in the longitudinal direction. The variation of the distances between cells may impact the flow of the cooling fluid, and advantageously improve cooling of the battery cells 102. FIGS. 7*a* and 7*b* shows two examples of variable distribution of the rows and the columns of the battery cells 102 inside the battery module 100.

Figure 13:
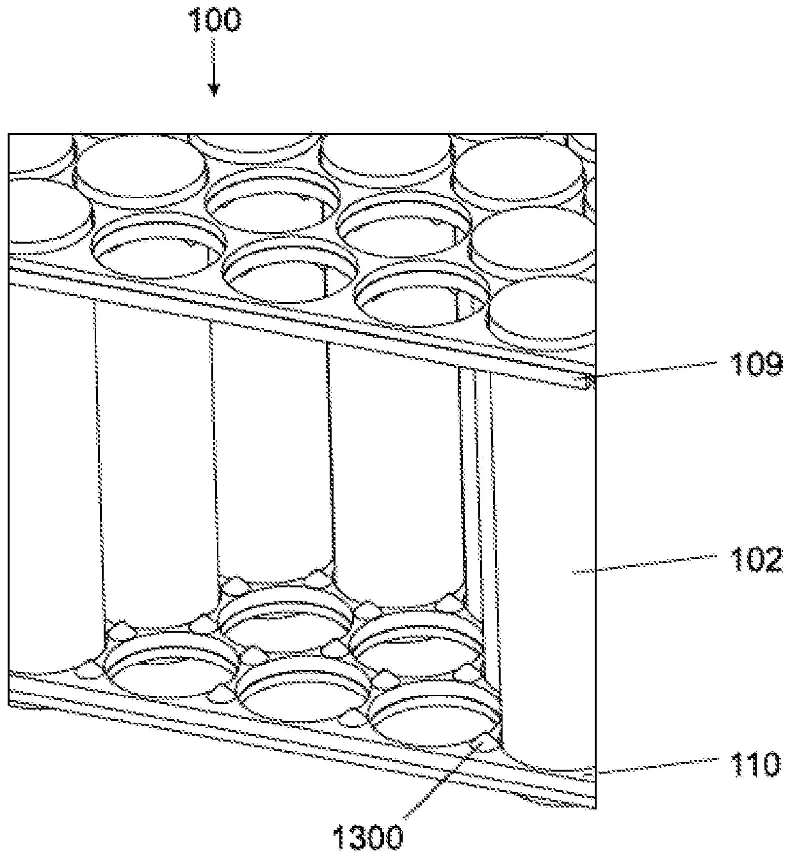
FIG. 13 illustrates a partial cross-section view of the battery module comprising a guiding protrusions, according to certain embodiments of the invention.

The cell holders may also comprise a plurality of guiding protrusions 1300 around at least some of the through holes 207 intended for placing a battery cells 102. The guiding protrusions are shown in FIG. 13. Guiding protrusions 1300 serve to compensate for possible positioning imprecision of a robot machine which assembles a plurality of battery cells 102 into the cell holders 109,110. In one preferred embodiment there are three guiding protrusions 1300 around at least one of the through hole 207.

Advantageously, a relatively small number of parts may be used in the structure of rather complicated battery box 202. In one preferred embodiment, the battery box is integrally made in one piece of material. Preferably, the battery box 202 is fabricated using injection molding or 3D printing.

FIG. 6 illustrates a top view of the battery module 100 without the cover 201. It shows the inlet 103, the outlet 104, LH and HV connections 105,106. In addition, FIG. 6 shows the plurality of battery cells 102 positioned in the through holes 207 of the first cell holder 109 together with the beams 401. Finally, FIG. 6 also shows guiding through holes 601 positioned on the opposite side of the cell holder 109 from the inlet 103 and the outlet 104. The proximal side of the module 100 may be defined as a side where the inlet 103 and the outlet 104 for the cooling fluid are placed, hence the distal part of the module is at the opposite side of the battery module. In reference to FIG. 6, the proximal side is on the left and the distal side is on the right.

FIG. 8*a* shows a cross-sectional view of the distal part of the battery module 100. Three identical battery cells 102 are shown having a first end 803 and a second end 804, and each of the battery cells 102 has a positive terminal 801 and a negative terminal 805. Both terminals of the battery cells are connected to the interconnection 111. FIG. 8*a* shows connection between the interconnect 111 and the positive terminal 801 using the connection 802, while the connection of the negative terminal is not shown. The essential feature of the invention is that the battery cells 102 are projecting through the first cell holder 109 and/or the second cell holder 110 i.e. the battery cells are projection through at least one of the cell holders 109 and 110. The important geometrical dimension parameters of the battery module 100 are marked as follows:

- d1—distance between the first cell holder 109 and the first end 803 of the battery, which correspond to the length of the projection of the battery cell 102;
- d2—distance between the second cell holder 110 and the second end 804 of the battery, which corresponds to the length of the projection of the battery cell 102;

- d3—distance between the cover 201 and the first end 803 of the battery cell 102
- d4—distance between the second cell holder 110 and the interconnect 111;
- d5—distance between the base 108 and the interconnect 111;
- d6—size of the battery cell 112.

The distance between the first cell holder and the base, the distance between second cell holder and the cover, and the distance between cell holders, may affect the flow and flow speed and pressure in the battery module. By reducing or increasing those distances cooling and temperature balance may be improved.

Another important parameter is the thickness of the cell holders. Theses thicknesses are preferably the same, but they can be different as well since this is not an essential feature. The thickness of the cell holders in some embodiments may not be uniform along the longitudinal or transversal direction. The distances d1 and d2 correspond to the size of the projection of the battery cell through the cell holders, and they may be the same or different in specific embodiments.

The sizes of the projections may vary relative to the size of the battery cell, and In one embodiment the sizes d1 and d2 of the projection of the battery cells inside the first cooling channel and to the second cooling channel is at least 0.5% of the total size d6 of the battery cells.

Figure 8B:
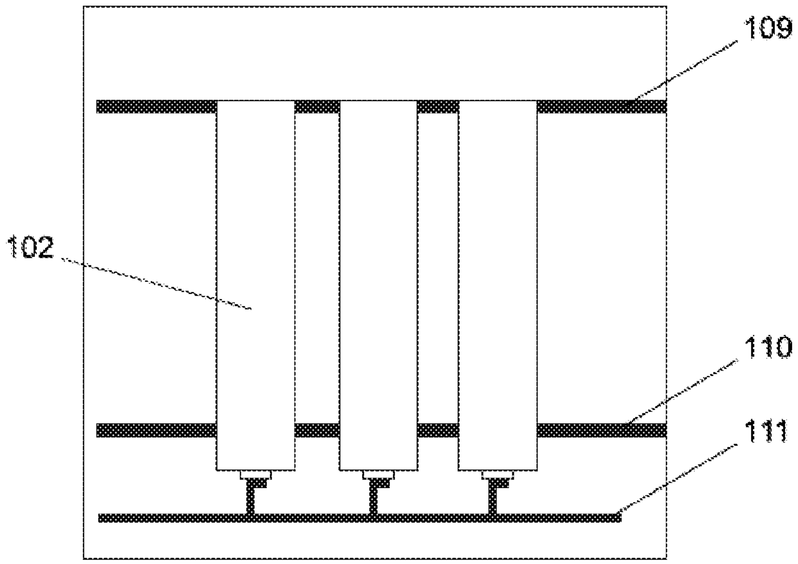

FIG. 8*b* shows an embodiment wherein the battery cells 112 are projecting only through the second cell holder 110, i.e. the distance d1 is substantially zero.

Figure 11:
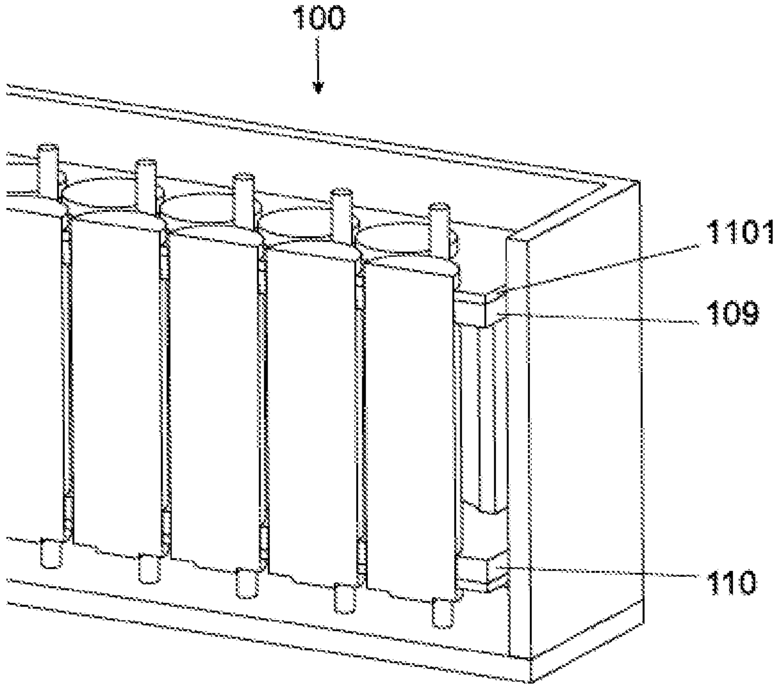
FIG. 11 illustrates a partial perspective view of the battery module comprising coating applied on the cell holder, according to certain embodiments of the invention.

In one embodiment, as shown in FIG. 11, at least one of the cell holders 109,110 comprises a layer 1101. In one embodiment the layer 1101 may be deposited on its top or bottom. The purpose of the layer 1101 is the improvement of the fluid-tight seal between each of the battery cells 102 and the through holes 207 on the first cell holder 109 and the second cell holder 110. In another embodiment, the layer 1101 may be a plastic sheet or the layer 1101 may be an integral part of the holder 109 or 110. In one preferred embodiment the layer 1101 may be solidified potting liquid or layer produced using 2K overmoulding. In another embodiment, the layer 1101 may be a glue or similar material adapted to improve the sealing. Any combination of these and other sealing features may be utilized without limiting the invention.

The introduction of the layer 1101 has at least two important advantages:

- a) structural: structurally bonding the cell 102 to cell holders i.e. holding the cell in all directions and rotations to the cell holder, and minimizing cell vibrations;
- b) cooling: disabling crossflow i.e. the layer 1101 helps to seal the path of the cooling flow and eliminate a leakage as it will be described further below.

Figure 12:
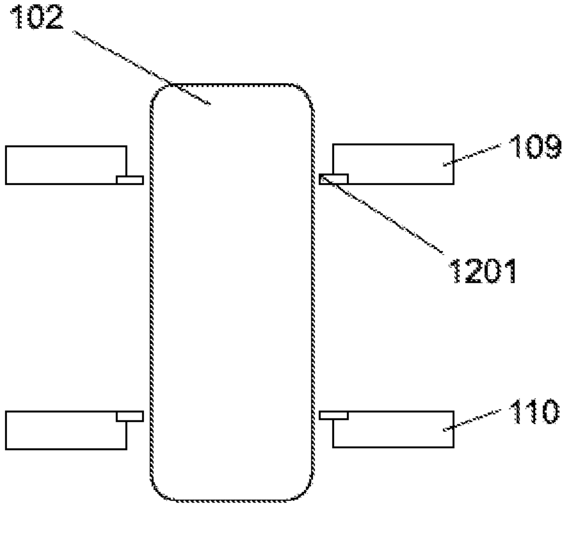
FIG. 12 illustrates a partial cross-sectional view of the battery module comprising stabilizing member, according to certain embodiments of the invention.

In one preferred embodiment, to further improve the sealing and to help potting dispensing, there is provided a stabilizing member 1201 positioned inside the through holes 207 as shown in FIG. 12. The stabilizing member 1201 may be in the form of a ring or a lip. In one preferred embodiment, a thickness of the stabilizing member 1201 is smaller than thickness of the cell holders as shown in FIG. 12. In another preferred embodiment, the stabilizing member 1201 is an integral part of the cell holder 109,110. For example, the stabilizing member 1201 may be fabricated by injection moulding process. In any case, the stabilizing member have to be adapted to accept the battery cells 102 regarding cross-section shape and size.

Figure 9:
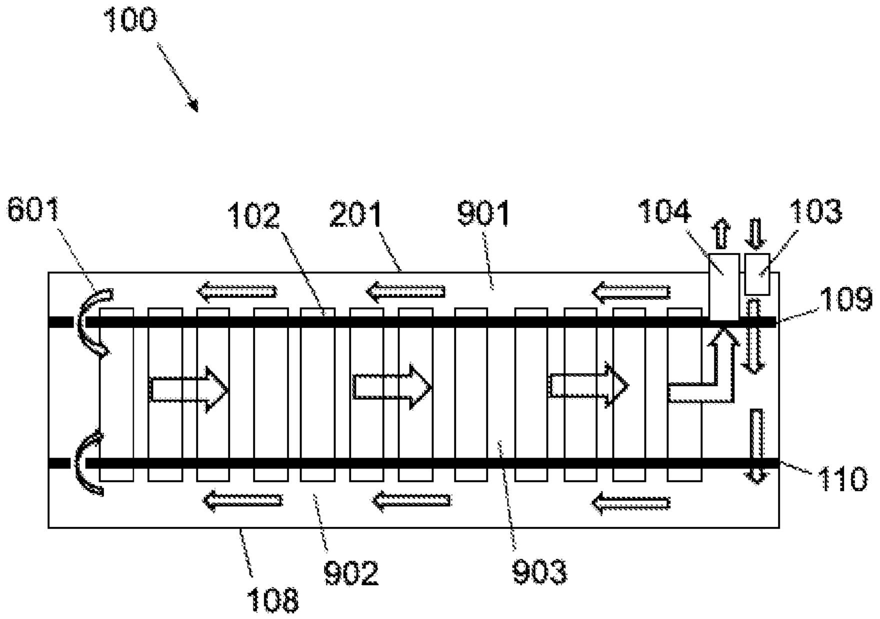
FIG. 9 illustrates a cross-sectional view of the battery module indicating the directions of a cooling fluid inside and outside the battery module, according to certain embodiments of the invention.

FIG. 9 shows a cross-sectional view of the battery module 100, and a schematic representation of a flow of the cooling fluid inside the battery module 100. The cooling space inside the battery module is divided into three cooling channels by the cell holders 109 and 110. A first cooling channel 901 is at least partially bounded by the cover 201 and the first cell holder 109. A second cooling channel 902 is at least partially bounded by the base 108 and the second cell holder 110, and a middle cooling channel 903 is at least partially bounded by the first cell holder 109 and the second cell holder 110. In one embodiment all the channels are also bounded by the side walls 205 and 206. As shown in FIG. 9, in this embodiment the battery cells 102 are projecting inside the first cooling channel 901 and the second cooling channel 902, while in another embodiments the battery cells may project in only one channel 901 or 902.

In one embodiment the first cooling channel 901 and the second cooling channel 902 are both fluidly connected to the inlet 103 on the proximal side of the module i.e. right side in FIG. 9. The first cooling channel 901 and the second cooling channel 902 are also both fluidly connected to the middle cooling channel 903 on the distal side of the module i.e. left side in FIG. 9. In one embodiment this connection is achieved via the at least one guiding through hole 601. In one preferred embodiment, there are four guiding through holes 601. The middle cooling channel 903 is fluidly connected with the outlet 104. In another embodiment, the inlet and the outlet may be positioned in the middle of the battery module 100.

During the cooling operation, the cooling fluid may be brought to the battery module 100 through the inlet 103, and it is further split into the cooling channels 901 and 902. The first cooling channel 901 and the second cooling 902 channel may be fluidly connected through a pipe. The inlet 103 is preferably positioned on the cover 201, but this is not an essential feature of the invention. In one embodiment the method of the cooling comprises the steps performed in the following order: guiding the cooling fluid over the first ends 803 and/or the second ends 804 of the battery cells 102, i.e. through the channels 901 and 902, and then guiding the cooling fluid over the middle part of the battery cells 102, i.e. through the middle channel 903. After passing through the middle channel 83, the cooling fluid is guided outside the module through the outlet 104, which may be positioned on the cover 201. At the outlet 104 the temperature of the cooling fluid is higher than at the inlet, as the plurality of the batteries cells 102 were cooled by the cooling fluid. Preferably, the cooling fluid is a dielectric fluid.

Advantageously, the cooling fluid is guided in a loop, making two U-turns utilizing the lower temperature of the incoming coolant fluid as it enters the battery module 100 to cool the warmest regions of the battery cells 102.

Figure 10A:
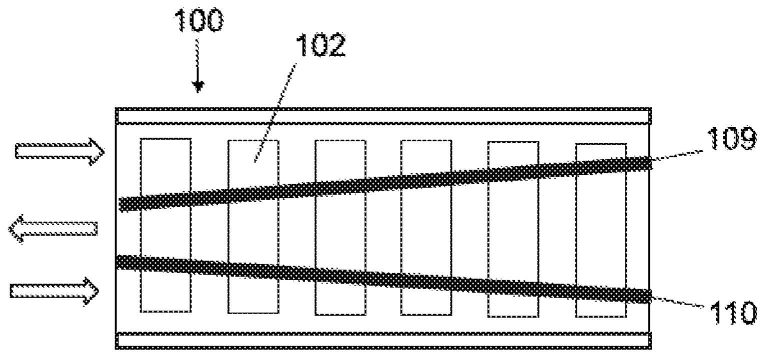
FIGS. 10*a*-10*c* illustrate a cross-sectional view of the battery module indicating different variations of the positions and numbers of cell holders of the battery module, according to certain embodiments of the invention.
Figure 10B:
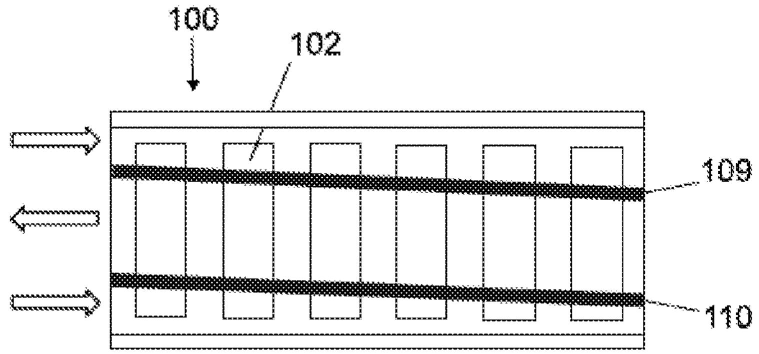
Figure 10C:
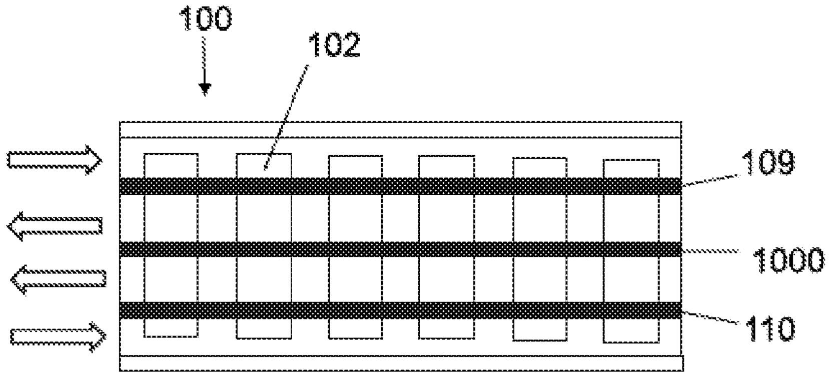

While some of the preferred embodiments described above have the first cell holder 109 and the second cell holder 110 positioned substantially parallel to each other, there are other possible configurations in accordance with the invention. In particular, in some embodiments a distance between the first cell holder 109 and the second cell holder 110 is varying in a longitudinal direction. FIG. 10*a* shows the battery module 100 wherein the distance between the first cell holder 109 and the second cell holder 110 is decreasing in the longitudinal direction. In another embodiment shown in FIG. 10*b*, the distance between the cell holders is constant, but they are oriented at certain angle to the cover 210 and the base 108. In another embodiment shown in FIG. 10*c*, there is an additional cell holder 1000 positioned between the first cell holder 109 and the second cell holder 110.

In one preferred embodiment, the battery cells 102 are lithium-ion cells. In one embodiment the battery modules 100 are combined in a battery pack. In another preferred embodiment, the battery module 100 and the method for cooling are used in electric vehicles such as hybrid electric vehicles, plug-in hybrid electric vehicles and all-electric vehicles.

In an ideal case the battery cell 102 should be under isothermal conditions to ensure maximum lifetime. In reality this is not possible due to varying thermal resistances, so temperature difference appears between the cell insides and cell surface. Radial and axial thermal conductivity difference increases this temperature difference even further. Temperature difference over time leads to degradation and reducing the temperature difference in each cell and between all cells in a module is vital for pack longevity. The embodiments according to the invention advantageously decrease temperature difference between battery cells in the battery module 100 i, e. there is a significant improvement in the temperature uniformity of the individual battery cells and across the different battery cells.

LIST OF PARTS

100 battery module
101 module housing
102 battery cell
103 inlet
104 outlet
105 Low Voltage (LV) connection
106 High Voltage (HV) connection
107 housing wall
108 base
109 cell holder
110 cell holder
111 cell interconnections
112 battery management system (BMS)
201 cover
202 battery box
203 battery box wall
204 battery box wall
205 side wall
206 side wall
207 through hole
400 battery box
401 structural beam
601 channel through holes
801 battery terminal
802 connection
803 first end
804 second end
805 battery terminal
901 first cooling channel
902 second cooling channel
903 middle cooling channel
1000 third cell holder
1101 layer
1201 stabilizing member
1300 guiding protrusions

The invention claimed is:

1. A battery module (100) adapted for use with a cooling fluid, the battery module comprising:

a housing (101) comprising a cover (201), a base (108), and a housing wall (107) that runs around circumferential direction;

a plurality of battery cells (102) positioned inside the housing (101), the battery cells having a first end (803)

and a second end (804) and each battery cell has a positive terminal (801) and a negative terminal (805);

an interconnection (111) for electrically connecting at least one terminal of the battery cells;

an inlet (103) fluidly connected with the housing (11) for feeding the cooling fluid into the housing (11);

an outlet (104) fluidly connected with the housing (101) for feeding the cooling fluid away from the housing (101);

a first cell holder (109) and a second cell holder (110) for holding battery cells, each cell holder positioned inside the housing (101), the first cell holder (109) and the second cell holder (110) spaced apart and each cell holder (109,110) connected to the housing (101);

a first cooling channel (901) at least partially bounded by the cover (201) and the first cell holder (109);

a second cooling channel (902) at least partially bounded by the base (108) and the second cell holder (110);

a middle cooling channel (903) at least partially bounded by the first cell holder (109) and the second cell holder (110);

wherein the first cooling channel (901) and the second cooling channel (902) are fluidly connected both to the inlet (103) and the middle cooling channel (903), and wherein the middle cooling channel (903) is fluidly connected with the outlet (104), wherein the inlet (103) and the outlet (104) are positioned at a proximal side of the battery module (100), and means (601) for fluidly connecting the first cooling channel (901) and the second cooling channel (902) with the middle cooling channel (903) is positioned at a distal side of the battery module (100) opposite to the proximal side, and wherein the means (601) for fluidly connecting the channels (901, 902, 903) is at least one through hole in the first cell holder (109 and/or in the second cell holder (110), and wherein at least one of the battery cells (102) is projecting, through the first cell holder, inside the first cooling channel (901) and/or projecting, through the second cell holder, inside the second cooling channel (902).

2. The battery module of claim 1, wherein the cell holders (109,110) are solid plates and/or the cell holders (109,110) are of substantially constant thickness.

3. The battery module (100) of claim 1, wherein the cell holders (109,110) comprise a plurality of through holes (207) for positioning the battery cells (102).

4. The battery module (100) of claim 3, further comprising a stabilizing member (1201) positioned inside at least one of the through holes (207).

5. The battery module (100) of claim 4, wherein thickness of the stabilizing member is smaller than thickness of the cell holders (109,110).

6. The battery module (100) of claim 4, wherein the stabilizing member (1201) is an integral part of the cell holder (109,110).

7. The battery module (100) of claim 1, wherein at least one of the cell holders (109,110) comprises guiding protrusions (1300) for facilitating positioning of the battery cells (102) into the cell holders (109,110).

8. The battery module (100) of claim 1, wherein the first cell holder (109) and the second cell holder (110) are positioned substantially parallel to each other.

9. The battery module (100) of claim 1, wherein a distance between the first cell holder (109) and the second cell holder (110) is varying in a longitudinal direction.

10. The battery module (100) of claim 9, wherein the distance between the first cell holder (109) and the second cell holder (110) is decreasing in the longitudinal direction.

11. The battery module (100) of claim 1, wherein the cover (201) and/or the base (108) has a convex shape.

12. The battery module (100) of claim 1 further comprising a battery box (202) for holding the battery cells (102), wherein the battery box (202) comprises two opposite battery box walls (203,204) connected to each other through the first cell holder (109) and the second cell holder (110), and wherein the first cell holder (109) and the second cell holder (110) are integral part of the battery box (202).

13. The battery module (100) of claim 12, wherein the housing wall (107) comprises two side walls (205,206) in addition to the two opposite battery box walls (203,204).

14. The battery module (100) of claim 12, wherein the battery box (202,400) is integrally made in one piece of a material, and/or wherein the battery box (202,400) is fabricated using injection molding or 3D printing.

15. The battery module (100) of claim 12 wherein the interconnection (111) is positioned between the second cell holder (110) and the base (108) or between the first cell holder (109) and the cover (201).

16. The battery module (100) of claim 12, wherein the size of the projection of the battery cells inside the first cooling channel (901) and/or inside the second cooling channel (902) is at least 0.5% of the total size of the battery cells (102).

17. The battery module (100) of claim 12 further comprising a third cell holder positioned between the first cell holder (109) and the second cell holder (110).

18. The battery module (100) of claim 12, wherein the battery cells (102) are oriented in a plurality of rows and columns.

19. The battery module (100) of claim 18, wherein a distance between the battery cells in one row and/or a distance between rows is substantially constant.

20. The battery module (100) of claim 18, wherein a distance between the battery cells in at least one row and/or a distance between at least two rows is variable.

21. The battery module (100) of claim 18, wherein a distance between the battery cells in at least one row is increasing in the longitudinal direction.

22. The battery module (100) of claim 12, wherein at least one of the cell holders (109,110) comprises a layer (1101) on top and/or bottom of the cell holder (109,110).

23. The battery module (100) of claim 22, wherein the layer (1101) is solidified potting liquid.

24. The battery module (100) of claim 1, wherein the battery module further comprises a plurality of structural beams (401).

25. The battery module (100) of claim 24, wherein the structural beams (401) are extending from the first cell holder (109) to the second cell holder (110) and/or from the first cell holder to the cover (201) and/or from the second cell holder (110) to the base (108).

26. A battery pack comprising the battery module 100 of claim 1.

27. A motor vehicle comprising the battery module 100 of claim 1.

28. A method for cooling a battery module (100) using a cooling fluid, the battery module comprising a plurality of battery cells (102) positioned inside the housing (101), an inlet (103), and an outlet (104), the battery cells having a first end (803) and a second end (804), the housing (101) comprising a cover and a base, a first cell holder (109) and a second cell holder (110) for holding battery cells, the first cell holder (109) and the second cell holder (110) spaced apart and each cell holder (109,110) connected to the housing (101), a first cooling channel (901) at least partially bounded by the cover (201) and the first cell holder (109), a second cooling channel (902) at least partially bounded by the base (108) and the second cell holder (110), and a middle cooling channel (903) at least partially bounded by the first cell holder (109) and the second cell holder (110), the method comprising the steps performed in the following order:

guiding the cooling fluid over the first end (803) and/or the second end (804) of the battery cells (102) through the first cooling channel and the second cooling channel, respectively;

after guiding the cooling fluid over the first end and/or the second end of the battery cells (102), guiding the cooling fluid over the middle part of the battery cells (102), through the middle cooling channel, and wherein the inlet (103) and the outlet (104) are positioned at a proximal side of the battery module (100), and means (601) for fluidly connecting the first cooling channel (901) and the second cooling channel (902) with the middle cooling channel (903) is positioned at a distal side of the battery module (100) opposite to the proximal side, and wherein the means (601) for fluidly connecting the channels (901,902,903) is at least one through hole in the first cell holder (109) and/or in the second cell holder (110).

29. The method for cooling the battery module (100) of claim 28, wherein the cooling fluid is dielectric fluid.

* * * * *